United States Patent
Tietz et al.

(10) Patent No.: US 7,390,582 B2
(45) Date of Patent: Jun. 24, 2008

(54) METHOD FOR PRODUCING A PROTECTIVE COATING FOR SUBSTRATES THAT ARE SUBJECTED TO HIGH TEMPERATURES AND FORM CHROMIUM OXIDE

(75) Inventors: Frank Tietz, Jülich (DE); Mohsine Zahid, Jülich (DE)

(73) Assignee: Forschungszentrum Julich GmbH, Julich (DE)

( * ) Notice: Subject to any disclaimer, the term of this patent is extended or adjusted under 35 U.S.C. 154(b) by 142 days.

(21) Appl. No.: 10/546,085

(22) PCT Filed: Jan. 14, 2004

(86) PCT No.: PCT/DE2004/000033

§ 371 (c)(1), (2), (4) Date: Aug. 17, 2005

(87) PCT Pub. No.: WO2004/075325

PCT Pub. Date: Sep. 2, 2004

(65) Prior Publication Data

US 2006/0193971 A1    Aug. 31, 2006

(30) Foreign Application Priority Data

Feb. 18, 2003    (DE) ................. 103 06 647

(51) Int. Cl.
*H01M 2/00*    (2006.01)
(52) U.S. Cl. ............... 428/701; 429/30; 429/34; 429/38; 429/39; 428/469; 428/702; 427/115; 427/126.3; 427/126.6; 427/419.2; 427/419.3

(58) Field of Classification Search ............ 429/34, 429/30, 38, 39; 428/469, 701, 702; 427/115, 427/126.3, 126.6, 419.2, 419.3
See application file for complete search history.

(56) References Cited

U.S. PATENT DOCUMENTS 5,942,349 A    8/1999    Badwal et al.

OTHER PUBLICATIONS

English translation of DE10050010 A1 to Frank Tietz, Apr. 18, 2002.*

* cited by examiner

*Primary Examiner*—John J. Zimmerman
*Assistant Examiner*—Aaron Austin
(74) *Attorney, Agent, or Firm*—Jonathan Myers; Andrew Wilford

(57) ABSTRACT

A method is disclosed for producing a protective coating on a chromium oxide forming substrate, in which on a surface of the chromium oxide forming substrate, a mixture of CoO, MnO, and CuO in suspension is applied, or a powdered CoO, MnO, and CuO is applied to said surface; at a temperature of 500 to 1000° C., to form a protective coating on the chromium oxide forming substrate, said protective coating consisting essentially of a uniform, gas-tight, compact, adherent chromium free spinel layer on which is coated a metal oxide layer of CoO, MnO, and CuO. Also disclosed are interconnectors for high temperature fuel cells as the chromium oxide forming substrates on which the protective coating is applied.

5 Claims, No Drawings

METHOD FOR PRODUCING A PROTECTIVE COATING FOR SUBSTRATES THAT ARE SUBJECTED TO HIGH TEMPERATURES AND FORM CHROMIUM OXIDE

CROSS REFERENCE TO RELATED APPLICATIONS

This application is the US national phase of PCT application PCT/DE2004/000033 filed 14 Jan. 2004 with a claim to the priority of German patent application 10306647.0 itself filed 18 Feb. 2003.

The invention relates to a protective coating for substrates subject to high-temperature loading, especially for interconnectors for high-temperature fuel cells, and to a method for making same.

STATE OF THE ART

A high temperature fuel cell (solid oxide fuel cell—SOFC) enables a direct conversion of chemical energy into electrical energy. The fuel ($H_2$, $CH_4$, CO, etc.) is supplied separately from an oxidizing agent ($O_2$, air) to an oxygen conducting solid electrolyte (typically yttrium-stabilized $ZrO_2$). At an operating temperature of the cell of about 600° to 1000° C., oxygen ions are conducted from the cathode side to the anode side through the solid electrolyte and react with the fuel at the anode side. The electrolyte is coated with a porous catalytically effective electrode material. In general the anode (fuel side) is comprised of an Ni/$ZrO_2$ cermet and the cathode (oxygen side) is comprised of an $LaMnO_3$-based perovskite.

To be able to use the SOFC technique for current generation, a number of cells must be connected together. For that purpose a further cell component is required, namely, the bipolar plate which can also be referred to as an interconnector. By comparison to the electrolyte and the electrode which may have thicknesses of the order of 100 μm, the bipolar plates mostly considered in today's SOFC flat cell concepts are a half millimeter to several millimeters in thickness and form not only the gas supplying connecting body between the individual cells but also the supporting components of the cells. Interconnectors for high-temperature fuel cells as well as a process for making them are known from the literature.

A substantial characteristic or property which is required for an interconnector alloy is a high oxidation resistance in the anode and cathode gases at the operating temperature. In addition it must be a metal of relatively low thermal coefficient of expansion (about $10 \times 10^{-6} K^{-1}$ to $13 \times 10^{-6} K^{-1}$) for thermophysical compatability with the ceramic cell components. The exact coefficient of thermal expansion will depend upon the particular cell concept, that is with fuel cells with an anode substrate as a mechanically supporting component, in general a somewhat higher coefficient of thermal expansion is required than with cell concepts in which an electrolyte foil forms a supporting component.

The desired combination of characteristics or properties required for interconnector materials can in principle be satisfied by high-temperature materials which are chromium-oxide formers. This group or class of materials form at typical SOFC operating temperatures an oxidic covering layer of a chromium oxide base which protects the material from rapid attack by oxidation. The usual chromium oxide forming materials (of an NiCr, NiFeCr or CoCr basis) are however not satisfactory for use in high-temperature fuel cells since they have substantially higher thermal expansion coefficients than the usual ceramic components of the cell. Consequently, especially for high-temperature fuel cells in the flat cell conception, predominantly two groups of chromium oxide forming materials are considered as interconnector materials: chromium based alloys or chromium rich alloys on an iron basis (ferritic steels).

At high temperatures (about 300° to 1200° C.) the chromium oxide coating reacts with oxygen and $H_2O$ to form chromium trioxide ($CrO_3$) and chromium oxide hydroxide ($CrO_2(OH)_2$, $CrO(OH)_4$) which because of their high vapor pressures at these temperatures can be transported through the gas spaces to the cathode or interfaces between the electrolyte and the cathode. There, these Cr(VI) compounds react with the cathode material and give rise to a catalytic limitation of oxygen reduction during fuel cell operation. This process contributes significantly to a reduction of the power and life of the fuel cell.

To reduce the chromium evaporation various methods have been proposed or used heretofore. For example, a process has been described in which the surface of the interconnector is coated with aluminum-rich layers. However, in this case the contact surfaces between the electrode and interconnector must remain aluminum free since otherwise too high a resistance is produced. The effect of chromium evaporation therefore is delayed but is not eliminated.

In an improvement in the process, the contact surfaces are additionally coated with nickel, cobalt or iron so that under the operating conditions a (Cr, Ni)-spinel coating, a (Cr, Co) spinel coating or a (Cr, Fe)-spinel coating can be formed and which reduces the chromium evaporation additionally.

In a further variant the interconnectors can be coated with lanthanum-containing layers ($LaCrO_3$, $La_2O_3$, $LaB_6$). Either the $LaCrO_3$ layer is applied directly or the chromium oxide formed is caused to react with a reactive lanthanum containing coating during the operation to produce $LaCrO_3$. In the literature it has already been indicated that microcracks in the $LaCrO_3$ layer do not heal and thus cannot ensure sufficient protection against chromium vaporization.

An entirely similar approach to the formation of protective coatings is either the use of steels which contain elements like for example manganese, nickel or cobalt which form spinel coatings under oxidizing conditions together with chromium or the application of manganese-containing layers which by reaction with chromium oxide also form spinel layers, the formation of these chromium-spinel structures gives rise to a detectable reduction of chromium evaporation (Ch. Gindorf, L. Singheiser, K. Hilpert, Steel Research 72 (2001) 528-533).

This is however not sufficiently low enough to ensure a sufficiently high efficiency and long life of th fuel cell since there will always be chromium diffusion through the chromium-containing spinel layer. In addition the spinel phase has, because of its high chromium content itself a Cr(VI) oxide or hydroxide vapor pressure. Thus additional chromium (VI) oxide and chromium oxide hydroxide compounds can be liberated.

As coating methods, the following processes were usually used:

Ion implantation: Incorporation of elements like for example Mn, Co, Ni, etc., in a substrate surface by means of an ion beam method.

Physical Vapor Deposition (PVD): Direct deposition of the protective coating by means of physical processes upon the substrate.

Chemical Vapor Deposition (CVD): Application of the protective coating by means of chemical reaction upon the substrate surface.

Plasma Spray: Application of the protective coating by the application of molten protective coating particles in a-plasma torch flare.

These methods can produce good protective coatings but they are in general cost intensive and result in an unnecessary increase in the cost of fuel cell production.

The interconnector material is customarily a chromium-oxide-forming metallic workpiece. For operating temperatures of an SOFC fuel cell (600-1000° C.) chromium is present in significant proportions in this material. Depending upon the type of material the chromium concentration will vary. In chromium-based alloys, the chromium content can vary for example between 60 and practically 100 weight %. In the usual high temperature structural materials based upon Fe, Ni or FeNi, the chromium content will vary from 13 to 30 weight %. By comparison to ceramic SOFC materials, NiCr and FeNiCr based materials, have too high coefficients of thermal expansion. For this reason up to now only Cr based and FeCr based alloys have been considered.

Cr or FeCr based materials often contain additional metallic alloying elements like for example manganese, magnesium, vanadium, etc. The concentrations of these elements usually amount to 0.1 to 5% by weight. A range of 0.3 to 1% by weight is however preferred. At operating temperatures of the fuel cell and prevailing oxidizing operating atmospheres, these elements have a tendency to diffuse very rapidly through the chromium (III) oxide coating which is formed on the surface of the material. These elements are found to be in an enriched state in oxidic form at the boundary surface or interface between the chromium III oxide layer and the gas. Through the use of the protective layer according to the invention, the use of such elements can be omitted.

OBJECT AND SOLUTION

The object of the invention is to provide a low-cost manufacturing method for a chromium-oxide evaporation protective coating for a chromium-oxide forming substance.

The object is achieved by a fabrication method according to the main claim. Advantageous embodiments of the method are to be found in the claims dependent thereon.

SUBJECT OF THE INVENTION

In the framework of this invention it has been found that a spinel coating encompassing manganese, cobalt and copper and which is fabricated by a special process advantageously forms a gas-tight coating which, arranged upon the chromium-oxide forming substrate, even at high temperatures up to 1000° C. can suppress as a rule evaporation of chromium from the substrate.

Such a protective coating is advantageously applied by painting or doctoring, spraying or by silk-screening or screen printing as a mixture of the corresponding oxides on a chromium-oxide forming substrate. At elevated temperatures up to 1000° C. and especially at temperatures between 600 and 900° C. (the typical operating temperature of an SOFC), these oxides form from the applied layer, a gas-tight spinel coating which does not contain any chromium or pick it up.

Typical chromium-oxide-forming substrates are for example interconnector materials. As cover layer forming elements in the case of high operating temperatures of an SOFC (typically 600 to 1000° C.), the material contains a significant proportion of chromium. The exact chromium concentration depends upon the type of the respective material. In chromium-based alloys, the chromium content can vary for example between 60% by weight and approximately 100% by weight. In the customary high structural materials on an Fe, Ni or FeNi basis, the chromium content usually amounts to 13 to 30% by weight. For an interconnector application, hitherto especially Cr based or FeCr based alloys were considered since NiCr and FeNiCr based materials by comparison to the ceramic SOFC material have too high a thermal coefficient of expansion.

According to the invention, a protective layer can be provided in a very simple and inexpensive manner for a Cr or FeCr based substrate and even a substrate with further metallic alloying elements like manganese, magnesium or vanadium in concentrations below 5 weight %. The substrate before it is used in the SOFC is provided with an oxidic or metallic protective layer which is composed of cobalt, manganese and copper and is such that it forms at the elevated temperatures a spinel coating which is so dense and gas-tight that a liberation of the chromium and thus a chromium evaporation from the substrate is effectively and as a rule permanently prevented. In this manner a sublimation of the chromium toward the cathode and a poisoning of the cathode or the cathode/electrolyte interface by chromium is effectively prevented. It should be noted in this regard that the formation of a chromium-free protective coating under oxidizing conditions and at the operating temperature can result after only a few hours of operation. Especially chromium-free spinel are thermodynamically stable at the operating temperature and have a sufficiently high electrical conductivity. They adhere well to the chromium oxide layer. The adhesion characteristics are good since the thermal expansion coefficient of both layers are comparable to one another.

By comparison to the other above-mentioned protective techniques, the undesigned invention has the following advantages which are decisive in SOFC technology:

a) The chromium-free spinel coating forms by a reaction of cobalt, manganese and copper from the applied layer and is uniform, compact, gas-tight and well adherent.

b) Microcracks which arise during long-term operation are induced for example by temperature cycling but in the chromium-free spinel coating as a rule tend to heal since sufficient reserves of the reactive elements is provided in the applied layer.

c) The outer coating can be applied by simple coating processes (spray or printing processes) and need not themselves be originally of high density.

SPECIAL DESCRIPTION PART

In the following the subject of the invention will be described in greater detail in connection with an embodiment without thereby limiting the scope of the invention.

The invention relates to an inexpensive method for applying chromium evaporation protective coating to interconnectors of an SOFC.

A mixture of one or more of the aforedescribed binary oxides in a defined ratio to one another (for example cobalt oxide, manganese dioxide and copper oxide) in the form of a suspension, for example a slurry applied by wet powder spraying, brushing or painting or silk-screening, is applied to the interconnector. To this the binary oxides involved in the process can be added in powder form. A pretreatment to bring about a chemical reaction between the individual oxides as is required by the conventional processes for producing spinels and perovskites, is not necessary. This makes the process several times less expensive than the hitherto used method in combination with the low-cost above-mentioned application techniques (wet powder spraying, painting, screen printing).

When the interconnector, before being used in the SOFC, is provided with this oxidic suspension or slurry, which is comprised of the spinel forming elements, like for example CoO, $MnO_2$ and CuO, the above-mentioned alloying elements in the applied protective layer react to form a dense, pore-free and especially chromium-free layer. A diffusion, especially of manganese from the steel as has been necessary from the surface of the interconnector through the chromium (III) oxide layer to form a dense protective layer is not absolutely required with these mixed oxides. This newly formed layer prevents on its side because of its gas-tight character a further liberation of the chromium and thus chromium evaporation. As a result a sublimation of the chromium to the cathode and the poisoning of the cathode which would result therefrom or of the cathode/electrolyte interface by the chromium is effectively suppressed.

The formation of this chromium-free protective layer with the composition $Co_{3-x-y}Cu_xMn_yO_4$ is effected already after a few hours under oxidized conditions and at temperatures above 500° C. This chromium-free Spinell is stable at the operating temperature of the fuel cell and has a sufficiently high electrical conductivity. It adheres well to the underlying chromium oxide layer since the thermal expansion coefficient of both layers are comparable. Since the Spinell itself is formed during the SOFC operation from the individual oxide, an expensive preparation of the starting material is not required and the coating can be made from mixtures of the individual oxide.

The invention claimed is:

1. A method of producing a protective coating on an interconnector for a high temperature fuel cell comprising a chromium oxide forming substrate, which comprises the step of:
   on a surface of the chromium oxide forming substrate, consisting essentially of CoO, MnO, and CuO in suspension to said surface, or applying powdered CoO, MnO, and CuO to said surface; at a temperature of 500 to 1000° C., to form a protective coating on the chromium oxide forming substrate, said protective coating consisting essentially of a uniform, gas-tight, compact, adherent chromium free spinel layer on which is coated a metal oxide layer of CoO, MnO, and CuO, said metal oxide layer containing sufficient reserves of the reactive elements in the CoO, MnO, and CuO to heal any microcracks in the chromium free spinel layer which form during operation of a high temperature fuel cell.
   wherein the uniform, gas-tight, compact, adherent chromium-free spinel layer has the composition $Co_{3-x-y}Cu_xMn_yO_4$ in which $0<x<1.5$, $0<y<3$ and $(x+y)<3$.

2. The method defined in claim 1 wherein the mixture of CoO, MnO and CuO in suspension is applied to the substrate surface by wet powder spraying, brushing, painting or silk-screening.

3. The method defined in claim 1 in which the applied mixture of CoO, MnO, and CuO additionally includes small amounts of nickel or iron.

4. A uniform, gas-tight, compact, adherent chromium-free Spinel protective layer on the surface of a chromium oxide forming substrate with the composition $Co_{3-x-y}Cu_xMn_yO_4$ with $0<x<1.5$, $0<y<3$ and $(x+y)<3$ on which is coated a metal oxide layer of CoO, MnO, and CuO, said metal oxide layer containing sufficient reserves of the reactive elements in the CoO, MnO, and CuO to heal any microcracks in the chromium free spinel layer which form during operation of a high temperature fuel cell.

5. An interconnector for a high temperature fuel cell which consists essentially of a chromium oxide forming substrate coated with a uniform, gas-tight, compact, adherent chromium-free Spinel protective coating with the composition $Co_{3-x-y}Cu_xMn_yO_4$ where $0<x<1.5$; $0<y<3$ and $(x+y)<3$ on which is coated a metal oxide layer of CoO, MnO, and CuO, said metal oxide layer containing sufficient reserves of the reactive elements in the CoO, MnO, and CuO to heal any microcracks in the chromium free spinel layer which form during operation of a high temperature fuel cell.

* * * * *